United States Patent
Lloret-Fillol et al.

(10) Patent No.: US 10,828,615 B2
(45) Date of Patent: Nov. 10, 2020

(54) PHOTOREACTOR

(71) Applicants: FUNDACIÓ INSTITUT CATALÀ D'INVESTIGACIÓ QUÍMICA (ICIQ), Tarragona (ES); INSTITUCIÓ CATALANA DE RECERCA I ESTUDIS AVANÇATS (ICREA), Barcelona (ES)

(72) Inventors: Julio Lloret-Fillol, Tarragona (ES); Carla Casadevall Serrano, Tarragona (ES); José Luis León, Tarragona (ES); Arnau Call Quintana, Tarragona (ES); Alicia Casitas Montero, Tarragona (ES); Joan Jose Pla, Tarragona (ES); Javier Pérez Hernández, Tarragona (ES); Francesc Xavier Caldentey Frontera, Tarragona (ES)

(73) Assignees: FUNDACIÓ INSTITUT CATALÀ D'INVESTIGACIÓ QUÍMICA (ICIQ), Tarragona (ES); INSTITUCIÓ CATALANA DE RECERCA I ESTUDIS AVANÇATS (ICREA), Barcelona (ES)

( * ) Notice: Subject to any disclaimer, the term of this patent is extended or adjusted under 35 U.S.C. 154(b) by 0 days.

(21) Appl. No.: 16/618,349

(22) PCT Filed: May 30, 2018

(86) PCT No.: PCT/EP2018/064177
§ 371 (c)(1),
(2) Date: Nov. 30, 2019

(87) PCT Pub. No.: WO2018/220008
PCT Pub. Date: Dec. 6, 2018

(65) Prior Publication Data
US 2020/0179896 A1  Jun. 11, 2020

(30) Foreign Application Priority Data

May 31, 2017 (EP) .................................. 17382313

(51) Int. Cl.
*B01J 19/00* (2006.01)
(52) U.S. Cl.
CPC ....... *B01J 19/0013* (2013.01); *B01J 19/0053* (2013.01); *B01J 2219/00144* (2013.01); *B01J 2219/00155* (2013.01)

(58) Field of Classification Search
CPC .... B01J 19/00; B01J 19/0006; B01J 19/0013; B01J 19/0053; B01J 19/08; B01J 19/12;
(Continued)

(56) References Cited

U.S. PATENT DOCUMENTS

2014/0050630 A1* 2/2014 Asano ................. B01J 19/122
422/186

FOREIGN PATENT DOCUMENTS

EP    2923754 A1 *  9/2015  ............ B01J 19/127

* cited by examiner

*Primary Examiner* — Natasha E Young
(74) *Attorney, Agent, or Firm* — Don D. Cha; HDC IP Law, LLP

(57) ABSTRACT

The photoreactor comprises at least one housing (11) for at least one reaction vessel and at least one light source for lighting said at least one reaction vessel, and the photoreactor comprises: a first module (1) provided with said at least one housing (11) for at least one reaction vessel and comprising a cooling/heating circuit (15) for regulating the temperature of said at least one reaction vessel; a second module (2) provided with said at least one light source; and a thermal insulating layer (5) placed between the first module (1) and the second module (2). It improves reproducibility of the reactions by temperature and light intensity control.

20 Claims, 4 Drawing Sheets

(58) Field of Classification Search
CPC .... B01J 19/122; B01J 19/127; B01J 2219/00; B01J 2219/00049; B01J 2219/00051; B01J 2219/00139; B01J 2219/00144; B01J 2219/0015; B01J 2219/00155; B01J 2219/08; B01J 2219/0871; B01J 2219/0873; B01J 2219/0877
See application file for complete search history.

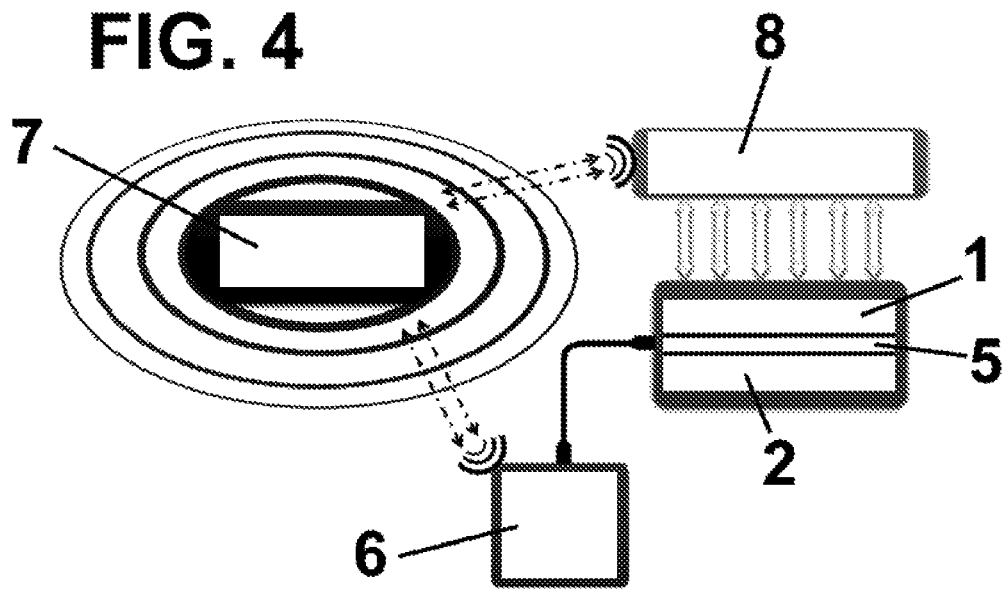

PHOTOREACTOR

CROSS-REFERENCE TO RELATED APPLICATIONS

This application is a 35 U.S.C. @371 U.S. National Stage Application of PCT Patent Application No. PCT/EP2018/064177, now WO 2018/220008, filed May 30, 2018, which claims the priority benefit of EP Patent Application No. 17382313.9, filed May 31, 2017, all of which are incorporated herein by reference in their entirety.

The present invention relates to a photoreactor comprising multiple light sources and vessels for the photoreactions, controlling the temperature and with the possibility of using a smart power source able to fix different intensities of light irradiation.

BACKGROUND OF THE INVENTION

During the last years, the field of photocatalytic transformations have attracted a growing interest among the scientific community. This type of reactions includes, e.g. reduction of ketones, C—H activation reactions (i.e. alkylation or arylation of C—H bonds), hydrogen generation.

There are known photoreactors as the one described in EP2923754. This type of "continuous" photoreactor is provided with several fluidic and illumination modules connected by passages through which the fluid passes from one end to the other of the device. The continuous flow device is useful for the photocatalytic treatment of large volumes of matter, such as in water treatment applications. Such device is not suitable for the exploration and optimization of the conditions of a photocatalytic process.

Current commercial photo-reactors do not allow for a basic, simultaneous and simple control of the light-intensity and the temperature, resulting in a poor reproducibility. Moreover, the absence of temperature control on one of both, the reactions or the LEDs, prevents the implementation of high light-intensity LEDs due to problems derived of overheating, such as un controlled temperature and light-intensity fluctuation during irradiation time and light source instability. The increase of light-intensity significantly improves the performance due to the reduction of the reaction times. This is even more problematic when high throughput experimental techniques (HTET), which are intrinsically densely packed, are being used to accelerate the development and optimization of photocatalytic chemical reactions, which are very sensitive to a broad range of conditions, such as: light intensity, wavelength of irradiation, temperature, concentration, solvent, photosensitizer, photoredox catalyst, loadings and ratios, additives, etc. HTET is an extremely useful and successful approach to deal with reaction discovery and optimization process in photoredox catalysed transformations since the number of variables to be optimized is usually large. For instance, catalyst, co-catalyst and substrate loadings, additives, solvent, temperature, light source and intensity all influence the output and the catalytic performance, leading to a typical volume of 1000-5000 experiments per study.

Therefore, the object of the present invention is to provide a photoreactor that provides high light intensity accelerating the reactions and improves reproducibility of the reactions by temperature and light intensity control as well as calibration in a HTET environment thanks to two separate modules, one for the light source(s) and one for the reaction vessels.

DESCRIPTION OF THE INVENTION

With the photoreactor according to the invention said drawbacks can be solved, presenting other advantages that will be described hereinafter.

The photoreactor according to the present invention comprises at least one housing for at least one reaction vessel and at least one light source for lighting said at least one reaction vessel, and it is characterized in that the photoreactor comprises:

a first module provided with said at least one housing for at least one reaction vessel and comprising a cooling/heating circuit for regulating the temperature of said at least one reaction vessel;

a second module provided with said at least one light source; and a thermal insulating layer placed between the first module and the second module.

Advantageously, the first module comprises a plurality of first housings and the second module comprises a plurality of light sources, the position of the first housings matching with the position of the light sources, and the thermal insulating layer being provided with holes or being transparent so as to permit the light from the light sources to reach the reaction vessels in said first housings.

Preferably, the second module comprises a plurality of second housings, each second housing being for one or more light sources, and each second housing comprises focusing means, such as a lens.

Furthermore, said second module also comprises a cooling/heating circuit for regulating the temperature of the light sources.

The photoreactor according to the present invention can also comprise a power source, preferably connected to an external control device, and a calibrating module allowing calibrating of the light intensity from said at least one light source, which is placed on said first module.

According to a possible embodiment, the photoreactor according to the present invention comprises a plurality of light sources mounted on one or more supports comprising an integrated electronic circuit.

Preferably, the light source that is comprised in the photoreactor of the invention is a light emitting diode (LED).

Advantageously, the first and second modules are separated by said thermal insulating layer, and the first and second modules and said thermal insulating layer are preferably fixed to each other, having substantially the same area.

Said thermal insulating layer is preferably characterized in that it has a thermal conductivity lower than 0.3 Watt per meter and per Kelvin; preferably lower than 0.25 Watt per meter and per Kelvin. A suitable material for the thermal insulating layer may be polytetrafluoroethylene (PTFE) or polycarbonate (PC).

The use of the thermal insulating layer in the photoreactor of the invention is advantageous as it allows for having a compact system and/or using light sources of high intensity since eventual heat transfer from the second module to the first module is avoided. It also advantageously allows operating the first and the second modules at different temperatures simultaneously. The reduced distance between the light source module and the reactions, in combination with the temperature control in both modules, allow to obtain high intensity of photon flux trough the reaction module.

The photoreactor according to the present invention improves reproducibility of the reactions by temperature, control of light intensity and of flux of photons as well as calibration in a HTET environment thanks to two separate modules, one for the light sources and one for the reaction vessels.

BRIEF DESCRIPTION OF THE DRAWINGS

For a better understanding of what has been disclosed, some drawings are attached in which, diagrammatically and only as a non-limitative example a specific embodiment is shown.

FIG. 4 is a block diagram of the connection between the modules, the power source, the control device and the calibration module.

DESCRIPTION OF A PREFERRED EMBODIMENT

Figure 1:
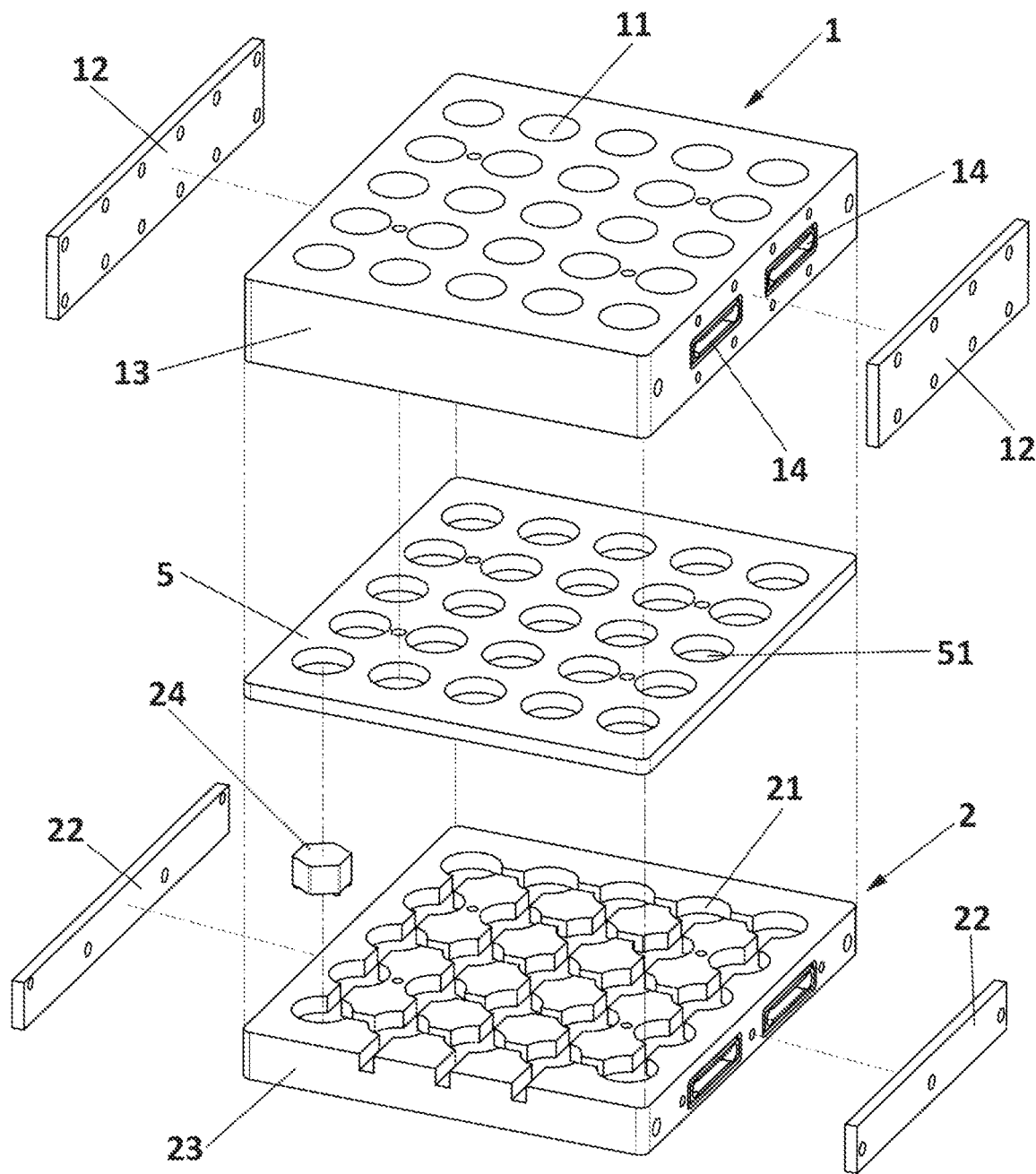
FIG. 1 is an exploded perspective view of the first and second modules and the thermal insulating layer of the photoreactor according to the present invention.
Figure 2:
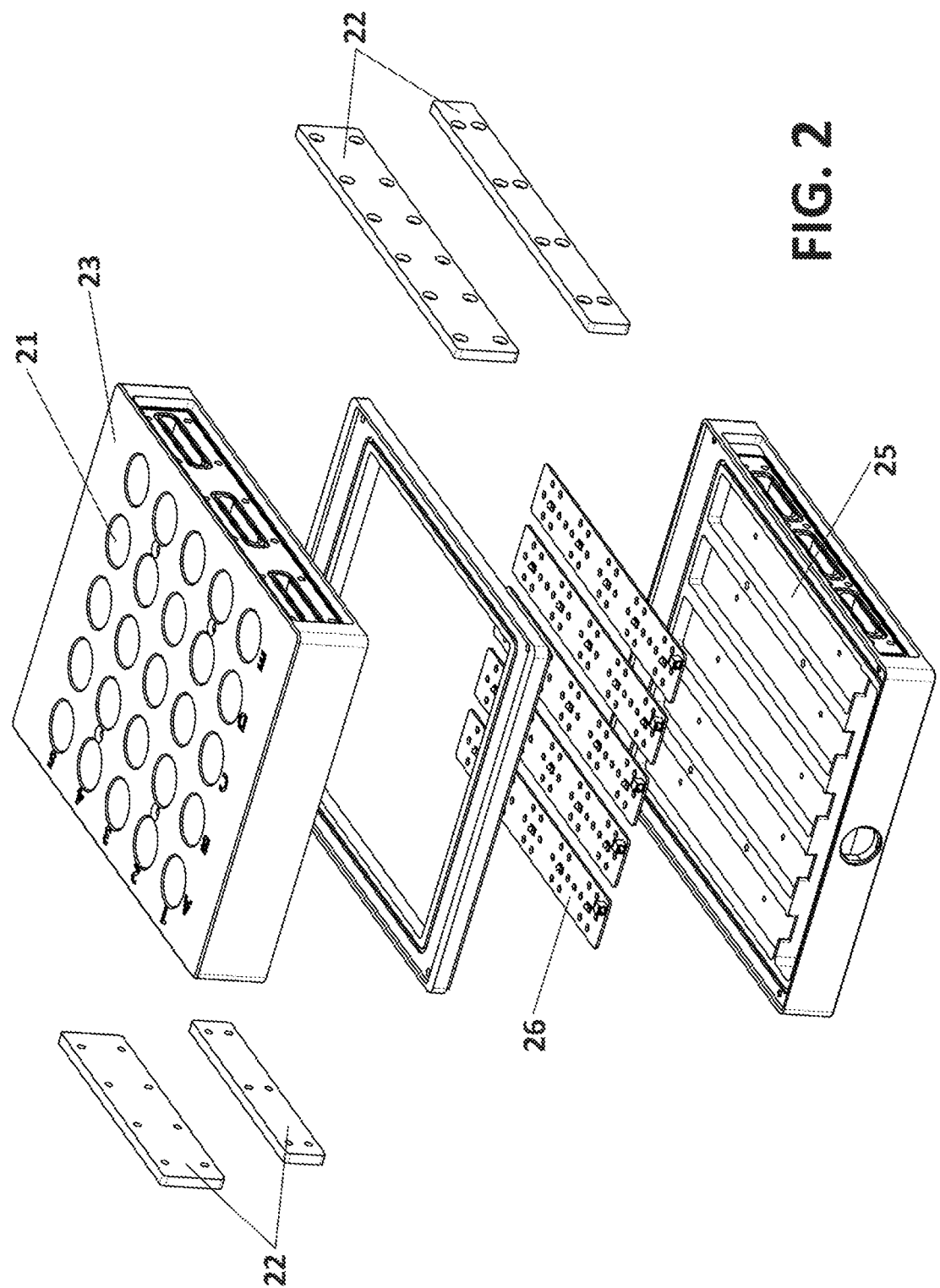
FIG. 2 is an exploded perspective view of the second module of the photoreactor according to an alternative embodiment of the present invention.

With reference to FIG. 1, the parallel photoreactor of the invention is formed by two independent modules provided with a plurality of openings:

a first module 1 provided with a plurality of housings 11 for reaction vessels, said reaction vessels being preferably tubes placed into the housings 11, the first module 1 having a height enough for covering completely the height of the reaction vessels, and a second module 2 provided with a plurality of housings 21 for placing light sources, such as LEDs 3, each housing 21 being provided with a lens 22 or another suitable focusing means.

The modules 1, 2 are separated by a thermal insulating layer 5 made of, for example, Teflon® or polycarbonate layer and fixed to each other preferably by screws. This thermal insulating layer 5 can comprise a plurality of holes 51 (corresponding to the housings 11, 21 of the first and second modules 1, 2) or it can be transparent, to permit the passage of light from the LEDs to the reaction vessels.

The first module 1 comprises a central piece 13 and two lateral pieces 12. The central piece 13 can be made of any material having high thermal conductivity, such as metals and composite materials, preferably aluminum. The central piece 13 can be further coated with an electrically insulating layer (obtainable by anodization).

The shape and dimensions diameter of the housings 11 housing the reaction vessels must be adapted to the shape of the reaction vessels. Cylindrical housings are preferred when the reaction vessel is a flask or a vial. In such a case, the diameter of the housing corresponds to the diameter of the reaction vessel.

The height of the first module 1 needs to be sufficient to cover the height of the solutions of reactant and reagents in the reaction vessels. Typically, the size of the reaction vessels can range from 250 microliters to 250 ml, while the height of the reaction vessel can range from 0.5 cm to 30 cm. Typically, the height of the first module 1 is between 1 cm and 20 cm (preferably from 1-5 cm).

The central piece 13 of the first module 1 further comprises a pair of connectors 14 (entry and exit connectors) allowing a cooling/heating liquid to enter/exit a cooling/heating circuit 15 of the central piece 13. A cooling/heating liquid flows through the cooling/heating circuit of the central piece 13 in such a way that each housing 11 is surrounded by one or more channels of flowing cooling/heating liquid.

Figure 3:
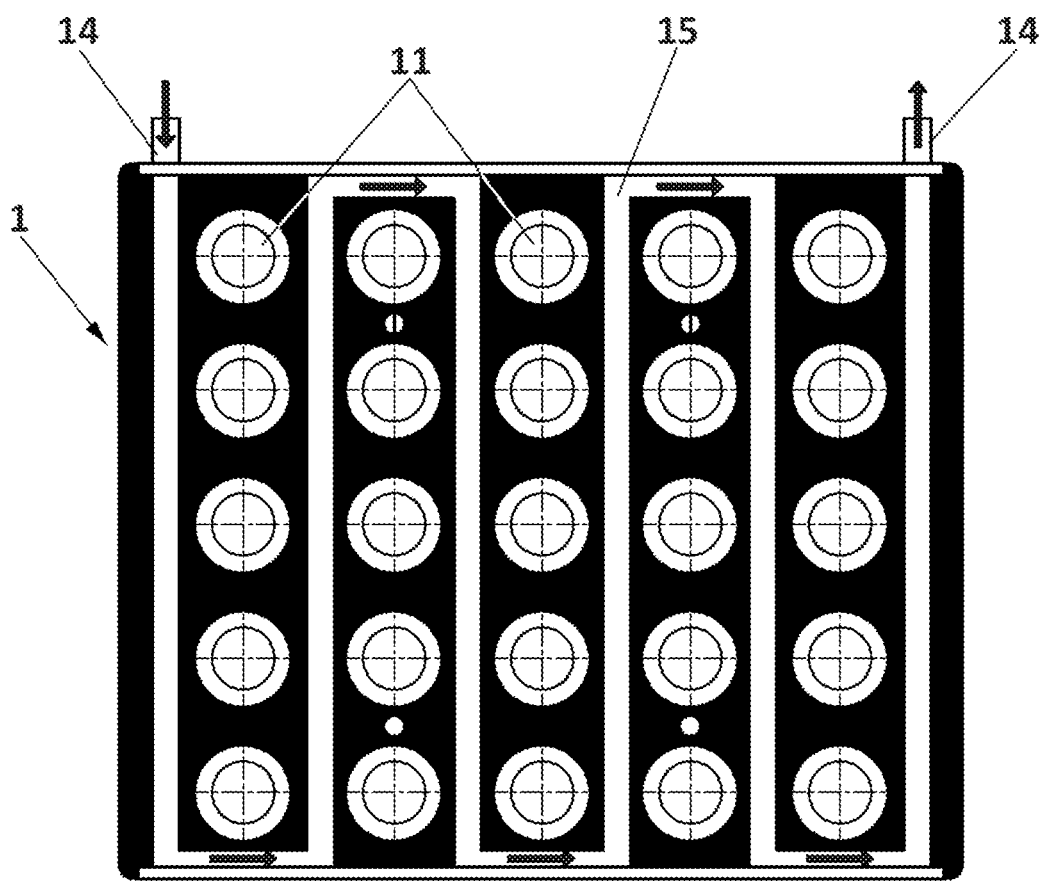
FIG. 3 is a diagrammatical view of the heating/cooling circuit of the first module.

As shown in FIG. 3, in a preferred embodiment, the cooling/heating liquid flows from the entry connector 14 through a channel running the whole length of the central piece 13, then turning 90° and turning another 90° once passed the closest housing 11 to run the whole length of the central piece 13, and repeating this sequence until reaching the exit connector 14.

To this central piece 13 it can be fixed (e.g. by screwing) a lid (not shown in the drawings) preventing possible leakages of the cooling/heating system. A sealing gasket may be placed between the central piece 13 and the lid and/or between the central piece 13 and the lateral pieces 12.

The lid can be made of any material that would not suffer prolonged exposure to the cooling/heating fluid, such as plastics and metals. Typically, the lid is made of aluminum.

The second module 2 also comprises a central piece 23 and two lateral pieces 22. The features of the central piece 23 are similar to those of the central piece 13 for the first module 1 (materials, cooling system, dimensions) and the features of the lateral pieces 22 are similar to those of the lateral pieces 12 of the first module 1 (materials, fixation).

A sealing gasket may be placed between the central piece 23 and the lateral pieces 22.

Each housing 21 in the second module 2 comprises focusing means 24. The focusing means 24 may consist of a lens made of glass or plastic mounted on a plastic support which can be placed into a housing 21. In this design, a thermally conductive adhesive, such as an epoxy resin is used to fix the lens 24 inside the housing 21.

At least one light source, such as a LED, is fixed into each housing 21 (1 to 10 LEDs, preferably 1 to 3 LEDs, for regulating the light intensity), using a thermally conductive adhesive such as an epoxy resin. Each LED is connected through electrical wires to an external power source 6.

Advantageously, since the second module 2 includes a cooling/heating circuit 25 equivalent to the circuit 15 of the first module 1, high-power LEDs can be used. The LEDs can be connected electrically in series or in parallel. The LEDs comprised in the same row/column form a "channel", each channel being connected to a transformer, and wherein each channel can be controlled independently through the power source 6, which allows controlling the intensity of light irradiation.

The power source 6 may further comprise a wireless emissor/receptor (e.g. by Bluetooth®) allowing remote control of each transformers feeding the channels through an external wireless control device 7 (computer, mobile phone, tablet, etc.) and a suitable software interface.

In an alternative embodiment, the central piece 23 of the second module 2 can comprise at least one support 26 comprising an integrated electronic circuit connecting contact positions where one or more light sources, such as LEDs, are mounted. In this case, the focusing means 24 are mounted on top of the contact positions.

In this design, the support 26 represents a channel and is connected to the power source 6 through standard electric wiring and a multipin connector embedded in the central piece 23 of the second module 2. Each channel is connected to the multipin connector through electrical wires.

The power source 6 is a power supply including a number of channels that corresponds to the number of row or columns in the photoreactor, with low ripple output and hardware control. The power source 6 has the capacity to regulate independently the current intensity and voltage outputs of different channels. This control avoids the damage of the LEDs but also allows for adjusting and calibrating the final LEDs light intensity. Likewise, a channel switch on protocol is implemented to prevent LEDs damage. This power supply can be controlled/programmed via USB or Bluetooth®.

The photoreactor according to the present invention may further comprise a calibration module 8 placed on top of the first module 1 and eventually separated from the first module 1 through a separation layer (not shown in the drawings) made of a transparent material (glass, PC, PMMA, plexiglass) and comprising for each housing 11 or row/column of housings 11 a light intensity measuring system combining a calibrated photodiode, which measures the light intensity, an analogic digital converter that converts the value of current intensity to a digital value, and a microcontroller, which controls the data acquisition and communication with the PC/tablet and a Bluetooth® shield for communications.

The device is designed to measure the light intensity from one or more LEDs or/and the real current intensity applied to each LED.

Optionally, the first and second modules 1, 2 and the thermal insulating layer 3 can be placed in a dry box for preventing condensation and they can also be subjected to stirring by conventional stirring means, preferable an orbital shaker and glass beats to ensure equal stirring in all the positions and maximize the light passing though the solution since magnetic stirring with magnetic bars cause shadows and led to no homogeneous stirring.

The operation of the photoreactor according to the present invention is the following.

First a calibration step is carried out by the calibration module 8. For this, the calibration module 8 is placed on the first module 1 and the photoreactor is switched on. The calibration module 8 controls that the suitable light intensity reaches the samples in the reaction vessels and, if necessary, changes the parameters for providing the suitable light intensity. This calibration step is not carried out every time the photoreactor is operated, but according to preset intervals such as, e.g. once a week.

The operation of the photoreactor begins placing the reaction vessels inside the housings 11 of the first module 1 and turning on the LEDs in the second module 2. The user can control, e.g. by an external device 7 (tablet or smartphone) the temperature and light intensity for improving the reproducibility of the reactions.

Even though reference is made to a specific embodiment of the invention, it is apparent for a person skilled in the art that the photoreactor is susceptible of numerous variations and modifications, and all the details cited can be substituted by other technically equivalent ones, without departing from the scope of protection defined by the attached claims.

The invention claimed is:

1. A photoreactor, comprising at least one housing (11) for at least one reaction vessel and at least one light source for lighting said at least one reaction vessel, wherein the photoreactor comprises:
   a first module (1) provided with said at least one housing (11) for at least one reaction vessel and comprising a cooling/heating circuit (15) for regulating the temperature of said at least one reaction vessel;
   a second module (2) provided with said at least one light source; and
   a thermal insulating layer (5) placed between the first module (1) and the second module (2);

characterized in that the first and second modules (1, 2) and said thermal insulating layer (5) are fixed to each other, and in that the first and second modules (1, 2) and said thermal insulating layer (5) have substantially the same area and wherein the first and second modules (1, 2) are separated by said thermal insulating layer (5).

2. The photoreactor according to claim 1, wherein the first module (1) comprises a plurality of first housings (11) and the second module (2) comprises a plurality of light sources, the position of the first housings (11) matching with the position of the light sources, and the thermal insulating layer (5) being provided with holes (51) or being transparent for permitting the light from the light sources to reach the reaction vessels in said first housings (11).

3. The photoreactor according to claim 1, wherein the second module (2) comprises a plurality of second housings (21), each second housing (21) being for one or more light sources.

4. The photoreactor according to claim 3, wherein each second housing (21) comprises focusing means (24).

5. The photoreactor according to claim 1, wherein it comprises a plurality of light sources mounted on one or more supports (26) comprising an integrated electronic circuit.

6. The photoreactor according to claim 1, wherein said second module (2) comprises a cooling/heating circuit (25) for regulating the temperature of the light sources.

7. The photoreactor according to claim 2, wherein said second module (2) comprises a cooling/heating circuit (25) for regulating the temperature of the light sources.

8. The photoreactor according to claim 5, wherein said second module (2) comprises a cooling/heating circuit (25) for regulating the temperature of the light sources.

9. The photoreactor according to claim 6, wherein the cooling/heating circuit (25) comprised in said second module is a circuit for a liquid fluid.

10. The photoreactor according to claim 7, wherein the cooling/heating circuit (25) comprised in said second module is a circuit for a liquid fluid.

11. The photoreactor according to claim 8 wherein the cooling/heating circuit (25) comprised in said second module is a circuit for a liquid fluid.

12. The photoreactor according to claim 1, wherein the at least one light source is a Light Emitting Diode.

13. The photoreactor according to claim 10, wherein the at least one light source is a Light Emitting Diode.

14. The photoreactor according to claim 11, wherein the at least one light source is a Light Emitting Diode.

15. The photoreactor according to claim 1 further comprising a power source (6).

16. The photoreactor according to claim 15, wherein said power source (6) is connected to an external control device (7).

17. The photoreactor according to claim 1 further comprising a calibrating module (8) for calibrating of the light intensity from said at least one light source.

18. The photoreactor according to claim 17, wherein the calibrating module (8) is placed on said first module (1).

19. The photoreactor according to claim 1, wherein said thermal insulating layer (5) has a thermal conductivity lower than 0.3 watt per meter and per Kelvin.

20. The photoreactor according to claim 1, wherein said thermal insulating layer (5) consists of polytetrafluoroethylene (PTFE) or polycarbonate (PC).

* * * * *